(12) United States Patent
Watrin

(10) Patent No.: US 11,750,061 B2
(45) Date of Patent: Sep. 5, 2023

(54) COMPACT GEAR MOTOR

(71) Applicant: MMT AG, Zug (CH)

(72) Inventor: Mathieu Watrin, La Chaux-de-Fonds (CH)

(73) Assignee: MMT AG, Zug (CH)

( * ) Notice: Subject to any disclaimer, the term of this patent is extended or adjusted under 35 U.S.C. 154(b) by 446 days.

(21) Appl. No.: 16/753,393

(22) PCT Filed: Oct. 4, 2018

(86) PCT No.: PCT/EP2018/076948
§ 371 (c)(1),
(2) Date: Jul. 28, 2020

(87) PCT Pub. No.: WO2019/068784
PCT Pub. Date: Apr. 11, 2019

(65) Prior Publication Data
US 2021/0152049 A1    May 20, 2021

(30) Foreign Application Priority Data

Oct. 6, 2017    (FR) ........................................ 1759387

(51) Int. Cl.
*H02K 7/116*    (2006.01)
*H02K 11/215*    (2016.01)
(Continued)

(52) U.S. Cl.
CPC .............. *H02K 7/116* (2013.01); *H02K 1/14* (2013.01); *H02K 11/215* (2016.01); *H02K 11/33* (2016.01);
(Continued)

(58) Field of Classification Search
CPC ...... H02K 7/116; H02K 11/215; H02K 11/33; H02K 1/14; H02K 2211/03
(Continued)

(56) References Cited

U.S. PATENT DOCUMENTS 5,750,948 A * 5/1998 Amonett ................ H01H 43/10
200/38 R
8,403,376 B2    3/2013 Grenier et al.
(Continued)

FOREIGN PATENT DOCUMENTS

CN    1170219 A  *  1/1998
CN    2335297 Y     8/1999
(Continued)

OTHER PUBLICATIONS

International Search Report and Written Opinion in corresponding PCT Application No. PCT/EP2018/076948 dated Dec. 12, 2018.

*Primary Examiner* — Jose A Gonzalez Quinones
(74) *Attorney, Agent, or Firm* — Harness Dickey & Pierce, PLC

(57) ABSTRACT

The present disclosure relates to a gear motor formed of a housing. An electric motor includes a stator assembly and a rotor driving a reduction gear train having a plurality of intermediate stages each formed by a shaft coupled to a toothed wheel and to a toothed gear. Also, an output stage is formed by a shaft coupled to a wheel and a coupling component, the shafts of the rotor, of the intermediate stages and of the output wheel being parallel. The gear motor further includes a printed circuit transversely positioned above the stator assembly, wherein the wheel of the output stage is positioned above part of the stator assembly, the shafts of the intermediate stages are located in the zone of the housing located on the opposite side, relative to a transverse vertical plane, of the zone including the shaft of the rotor and the shaft of the output wheel.

13 Claims, 12 Drawing Sheets

(51) Int. Cl.
*H02K 11/33* (2016.01)
*H02K 1/14* (2006.01)

(52) U.S. Cl.
CPC ...... *H02K 2211/03* (2013.01); *H02K 2213/03* (2013.01)

(58) Field of Classification Search
USPC .................................. 310/75 R, 83, 98, 99
See application file for complete search history.

(56) References Cited

U.S. PATENT DOCUMENTS

| | | | |
|---|---|---|---|
| 9,168,828 | B2 | 10/2015 | Bourqui et al. |
| 2005/0218727 | A1 | 10/2005 | Gandel et al. |
| 2013/0104682 | A1* | 5/2013 | Schneider .............. H02K 1/278 74/421 A |
| 2017/0373555 | A1 | 12/2017 | Sigg et al. |
| 2018/0219435 | A1 | 8/2018 | Billet et al. |
| 2019/0229587 | A1 | 7/2019 | Watrin et al. |
| 2019/0252944 | A1 | 8/2019 | Watrin et al. |
| 2019/0285190 | A1 | 9/2019 | Equoy et al. |
| 2020/0025306 | A1 | 1/2020 | Monnin et al. |

FOREIGN PATENT DOCUMENTS

| | | | | |
|---|---|---|---|---|
| CN | 2014478933 U | | 5/2014 | |
| DE | 4342185 A1 | | 6/1995 | |
| DE | 102011054956 A1 | | 5/2013 | |
| DE | 102014107900 A1 | | 12/2014 | |
| DE | 102013109997 A1 | | 3/2015 | |
| EP | 2640590 B1 | | 9/2014 | |
| EP | 3203111 A1 | | 8/2017 | |
| JP | 2006254534 A | * | 9/2006 | |
| JP | 2014087140 A | * | 5/2014 | ............ H02K 11/21 |
| WO | WO 2015/162557 A2 | | 10/2015 | |
| WO | WO 2017/013266 A1 | | 1/2017 | |
| WO | WO-2017013266 A1 | * | 1/2017 | ............... F16H 1/20 |
| WO | WO-2018060630 A1 | * | 4/2018 | ............ F02D 11/10 |

* cited by examiner

COMPACT GEAR MOTOR

CROSS-REFERENCE TO RELATED APPLICATIONS

The application is a National Phase Entry of International Patent Application No. PCT/EP2018/076948, filed on Oct. 4, 2018, which claims priority to French Patent Application No. 17/59387, filed on Oct. 6, 2017, both of which are incorporated by reference herein.

TECHNICAL FIELD

The field of the invention concerns the circulation of fluid inside an automotive vehicle (e.g., air conditioning louvers, water valve thermostat, cooling of batteries of an electric vehicle, etc.) or the controlled circulation of air from the outside (e.g., air grill louver). More particularly, it concerns a compact gear motor composed of a housing containing an electric actuator and a reduction gear train intended for driving a hydraulic closure component of a valve mechanically coupled thereto, for example a gate valve or a throttle valve. It involves components requiring a relatively high torque, on the order of 0.5 Nm, with a displacement of several tens of degrees and a typical positioning precision of less than 5 degrees, as well as being of minimal size. More specifically, the invention relates to gear motors intended for such devices, comprising a brushless electric motor, associated with a speed-reducing gear train, in the form of a very compact solution.

BACKGROUND

Known in the state of the art is Chinese utility model CN201478933 which describes a permanent magnet micromotor comprising a housing composed of a base and a cover forming a shell provided internally with a Y-shaped stator iron core. The motor comprises a rotor with a permanent magnet, an intermediate shaft parallel to the rotor shaft and an output shaft with one end extending outside of the housing. The stator iron core has three teeth with tooth spacing of 60 degrees, with two long teeth wrapped in a winding and one short tooth in the middle.

The Chinese utility model application CN2335297 describes an electric motor composed of a drive part, an orientation element and a speed reduction part. The polar parts of a stator of the drive part are designed in circular asymmetric arcs, convex and concave grooves, which can make non-uniform air spaces and can change the magnetic distribution conditions of the field. The orientation part and the speed reduction part have the advantage of a compact and rational structure. The utility model can improve the startup performance and the output torque of miniature motors, reduce noise and reduce the additional partial volume.

Also known from U.S. Pat. No. 9,168,828 is another actuator for a shutter grille of a vehicle. European patent application EP2640590 describes another example of a control device intended to regulate an air intake of a motor compartment of an automotive vehicle. Also known in the state of the art is patent application DE102014107900 describing an actuator with an electric motor, in particular a brushless direct current motor comprising a stator and a rotor provided with a drive gear that transmits the movement to a gear train with at least one intermediate wheel. It is also known to produce compact mechanical gear reduction systems, such as for example described in document DE4342185. More recently, it is also known to associate brushless electric motors with such compact reduction systems as described for example in U.S. Pat. No. 8,403,376.

The object of these devices of the prior art is to resolve the general problem of having a relatively compact mechanical reduction assembly. However, although compact, these devices do not allow a limited space requirement to be combined with a square-shaped footprint and small thickness while guaranteeing sufficient torque to move components such as shutters. Particularly, in the case of actuating thermoregulation shutters in an automotive vehicle, the market is demanding ever smaller and more numerous gear motor assemblies, involving a reduced footprint relative to the existing state of the art, while guaranteeing an actuating torque sufficient to move the shutter. Thus, the state of the art solutions utilizing compact gear reducers having at least two gear/toothed wheel assemblies per bearing shaft do not make it possible to fulfill the demands imposed on this type of application where there needs to be better integration between the motor and the gearbox, particularly by integrating these elements in a single housing that is relatively flat and narrow compared to the existing solutions.

SUMMARY

The present invention intends to overcome the disadvantages of the state of the art by proposing a gear motor that ingeniously associates a brushless electric motor and an assembly of movement-reduction gears, in a low-profile square footprint. To that end, the invention, according to the most general conception thereof, concerns a gear motor composed of a housing, comprising an electric motor having a stator assembly and a rotor driving a reduction gear train having a plurality of intermediate stages each composed of a shaft coupled to a toothed wheel and to a toothed gear, and an output stage composed of a shaft coupled to a wheel and a coupling component, the shafts of the rotor, said intermediate stages and said output wheel being parallel, said gear motor further comprising a printed circuit transversely positioned above said stator. Said wheel of the output stage is positioned above a portion of said stator, the shafts of said intermediate stages being situated in the zone of the housing situated on the opposite side, relative to a transverse vertical plane, of the zone comprising the shaft of said rotor and of the shaft of said output wheel.

Advantageously, said stator assembly has at least two stator extensions in the form of poles each carrying a winding, and a semi-annular closure zone and in which said wheel of the output stage is positioned above a portion of at least one of said stator extensions and of said windings. Advantageously, the gear motor according to the invention comprises:

an electric motor comprising a stator assembly with stator extensions in the form of poles offset two-by-two by 60° and a semi-annular closure zone extending over 240° and a rotor driving a reduction gear train having a plurality of intermediate stages each formed from a shaft coupled to a gear and to a wheel, and an output stage formed from a shaft coupled to a wheel and a coupling component, said gear motor further comprising an electronic circuit equipped with at least one electromagnetic probe for detecting the magnetic flux generated by the rotor, transversely positioned above said rotor, said wheel of the output stage being positioned above one of said stator extensions, where the shafts of said intermediate stages are situated on an arc in the zone of the housing complementary to the zone comprising the rotor and the shaft of the output stage, where said zone is situated on the opposite side, relative to a transverse vertical plane, of the zone comprising the shaft of said rotor and of said output wheel.

Preferably, the ratio between the length and width of said housing without connector or attachment member is between 0.8 and 1.2. According to a particular embodiment, the electronic circuit is equipped with at least one magnetism-sensitive probe for detecting the magnetic flux generated by the rotor.

Preferably, the printed circuit has a cutout for the passage of the wheel of the second intermediate stage. Advantageously, the printed circuit has an additional magnetism-sensitive probe positioned facing the displacement zone of a permanent magnet attached to the lower surface of said wheel of the output stage. According to one variant, the printed circuit extends transversely in the zone comprising the shaft of said rotor and of said output wheel.

According to one particular embodiment, the cover and/or the bottom of the housing has hollow projections forming guide bearings of the shafts of said rotor, of said intermediate stages and of said shaft of the output stage. Preferably, said projections are surrounded by ribs at least one of which is oriented in the direction of the lateral forces applied to the respective shaft.

According to a preferred embodiment, the reduction ratio of one stage is between 3 and 6. According to another advantageous embodiment, the total reduction ratio is between 200 and 600.

BRIEF DESCRIPTION OF THE DRAWINGS

The present invention will be better understood from the following description concerning a non-limiting embodiment, with reference to the appended drawings in which.

DETAILED DESCRIPTION

Description of the Drive Chain

Figure 1:
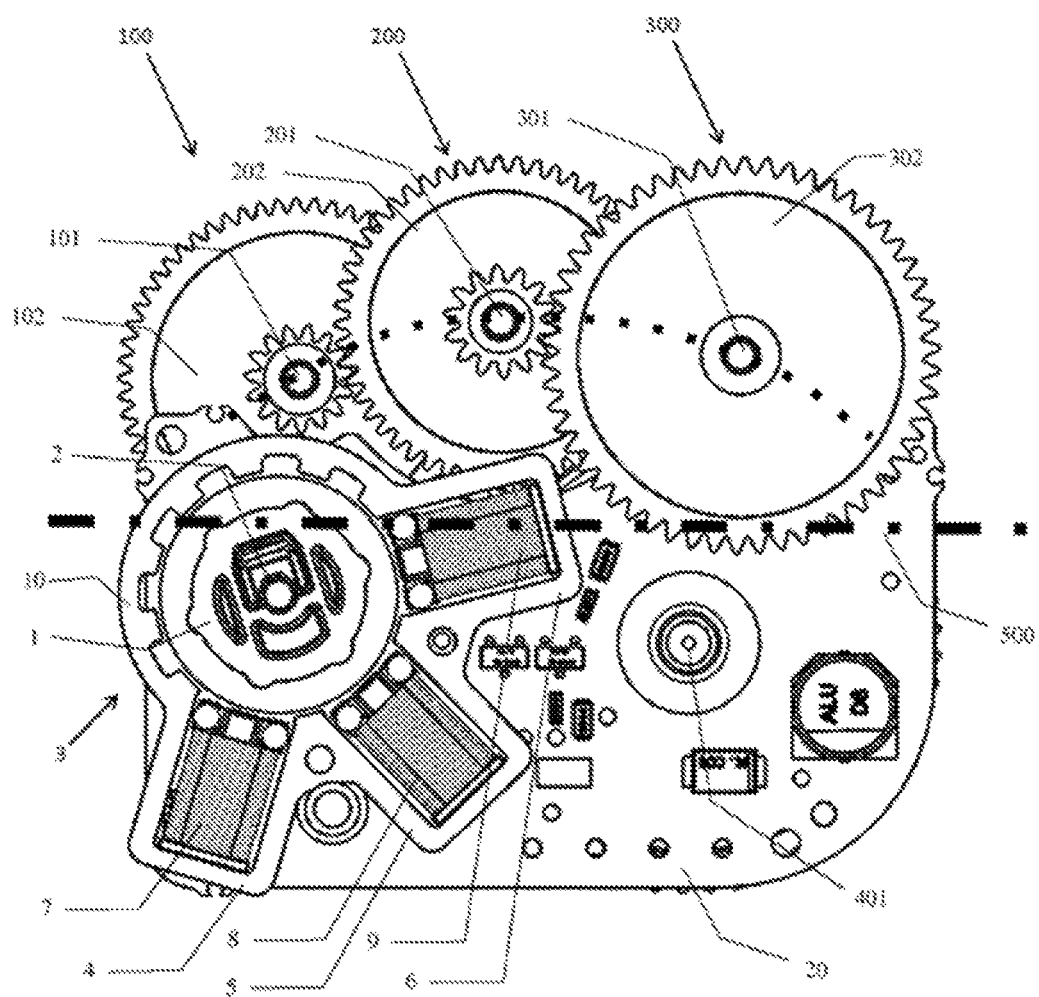
FIG. 1 shows a bottom view of a gear motor mechanism according to the invention.

The gear motor illustrated by the appended figures comprises a brushless motor which, in the described example, has three electric phases and is composed of a rotor (1) equipped with permanent magnets, turning around a shaft (2), and a stator assembly (3) having a plurality of poles that are composed of radial teeth of which here there are three long poles (4 to 6) each carrying windings (7 to 9), the winding axes whereof being spaced at a mechanical angle of 60° extending radially and prolonged by a toothed annular zone (10) extending over 240°. In the present non-limiting case, the motor used is a three-phase motor. The short radial teeth radially extending this toothed annular zone (10) constitute unwound poles.

Figure 9:
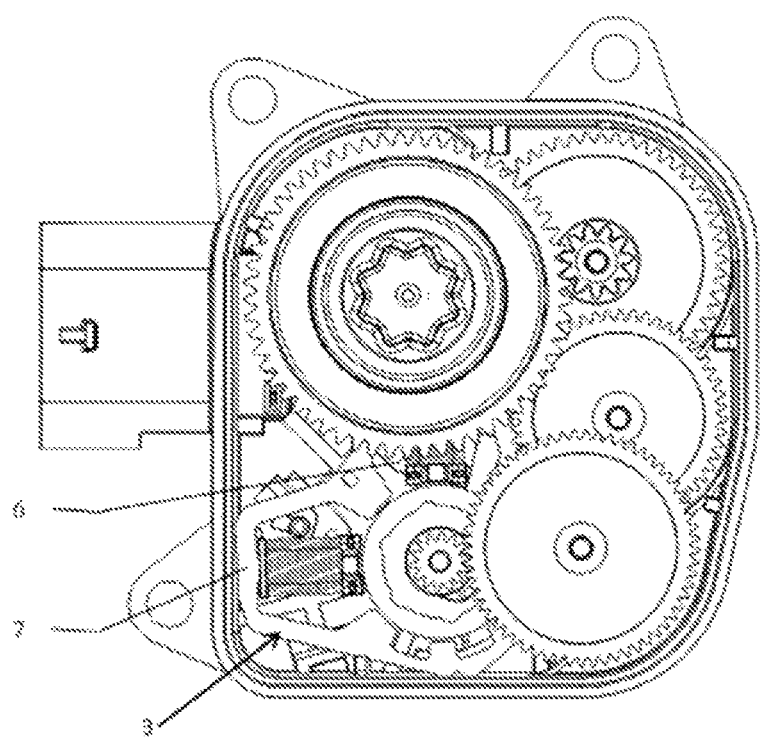
FIG. 9 shows a view of a gear motor and the housing thereof without cover and without printed circuit according to the invention, with a two-phase motor.

FIG. 9 shows an embodiment in which a two-phase motor is used. The stator assembly (3) has only two poles (6, 7) carrying windings, here with an angle of 90° between each of the windings. The topology of the motor is not limiting in the present invention.

Figure 3:
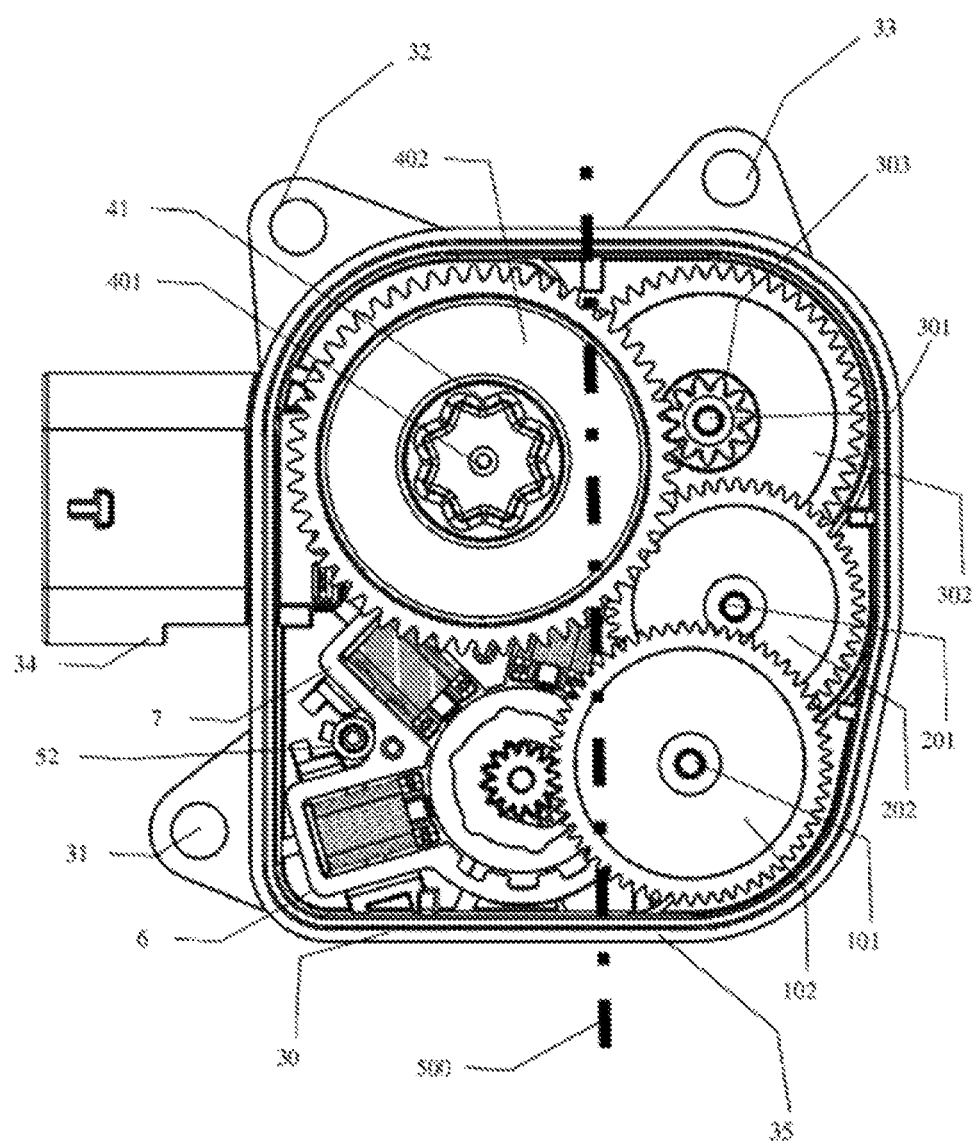
FIG. 3 shows a view of a gear motor and the housing thereof without cover and without printed circuit according to the invention with a three-phase motor.

The gear motor in the example of FIG. 3 comprises three intermediate reduction stages (100, 200, 300) each formed by a pair composed of a toothed wheel respectively (102, 202, 302) and a toothed gear (103, 203, 303) mounted securely on a shaft respectively (101, 201, 301) and an output stage (400) composed of a shaft (401) coupled to a wheel (402) and a coupling component. The input stage is composed of the gear (13) which meshes with the toothed wheel (102), ultimately forming a four-stage reducer. The reduction rates are respectively 4.3; 3.5; 3.8 and 5.2, or a total reduction ratio of about 300.

The shaft of the rotor (1) and the output shaft (401) are arranged on one side of a transverse plane (500), while the three shafts of the intermediate stages (101, 201, 301) are arranged on the other side of said transverse plane (500). This arrangement makes it possible to make best use of the available space to achieve a high reduction ratio in a reduced cross-section, and with a nearly square aspect ratio.

A printed circuit (20) supports the power supply and control components of the electric motor. The windings (7 to 9) are connected to the printed circuit (20) by solderless, press-fit type connections. A magnetism-sensitive probe is arranged on one of the faces of the printed circuit (20) facing the front surface of the rotor (1) in order to sense the magnetic field produced by the permanent magnets and furnish a control signal. Another magnetism-sensitive probe is arranged on the printed circuit (20), beneath the output wheel (402) equipped with a permanent magnet, in order to furnish a signal representative of the position of the output wheel.

Figure 2:
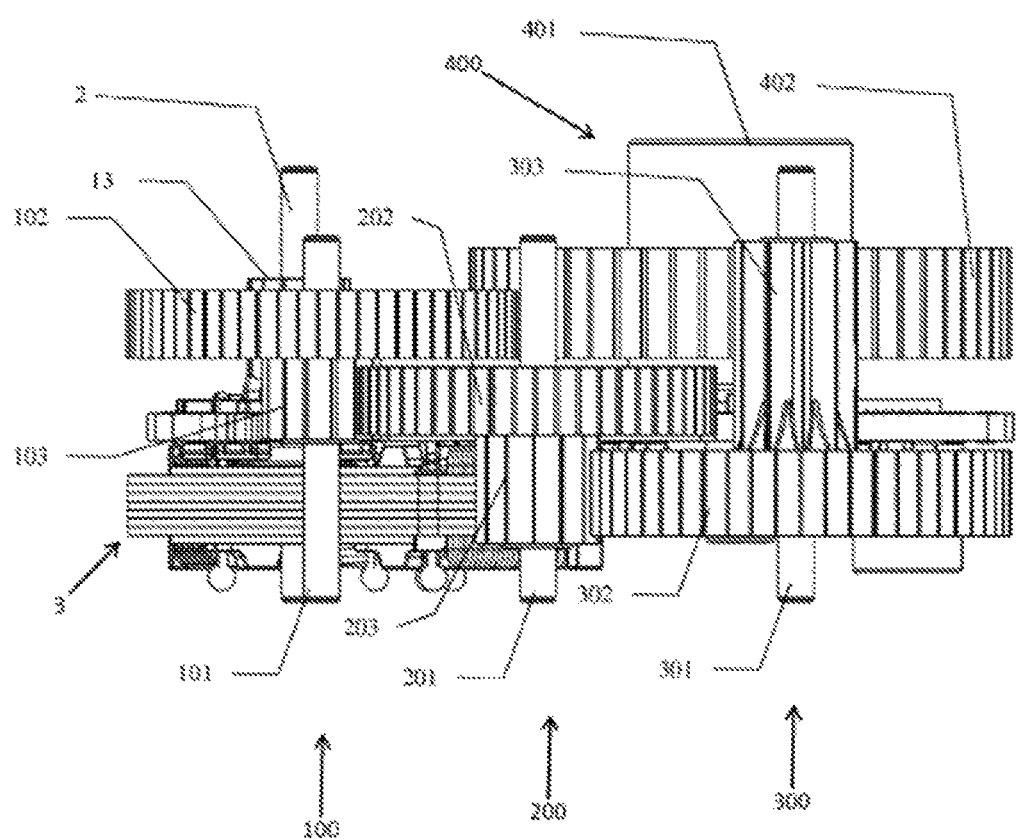
FIG. 2 shows a side view of a gear motor mechanism according to the invention.

As can be seen in FIG. 2, the stator assembly (3) and the wheel (302) of the third stage (300) are arranged beneath the printed circuit (20), while the wheel (102) of the first stage (100) and the output wheel (402) are arranged above the printed circuit (20). The wheel (202) of the second stage (200) is placed in the plane of the printed circuit (20), the edge whereof being cut to allow passage of said wheel (202).

As can be seen in FIG. 3, the assembly is placed in a housing (30) of nearly square cross-section, with a peripheral edge (35), which optionally can be fitted with a gasket, or can be laser-welded to the housing (30). The housing has three attachment tabs (31 to 33) having a bore therethrough for the passage of a rivet or bolt for attachment of the housing to a reception structure in the application. It also has a lateral extension (34) forming a connector for the passage of the electrical connections. The electrical connection is achieved by rigid curved conductors (61 to 64), visible in FIG. 6, the inner ends whereof being connected by forced insertion (press-fit) onto the printed circuit (20).

Figure 4:
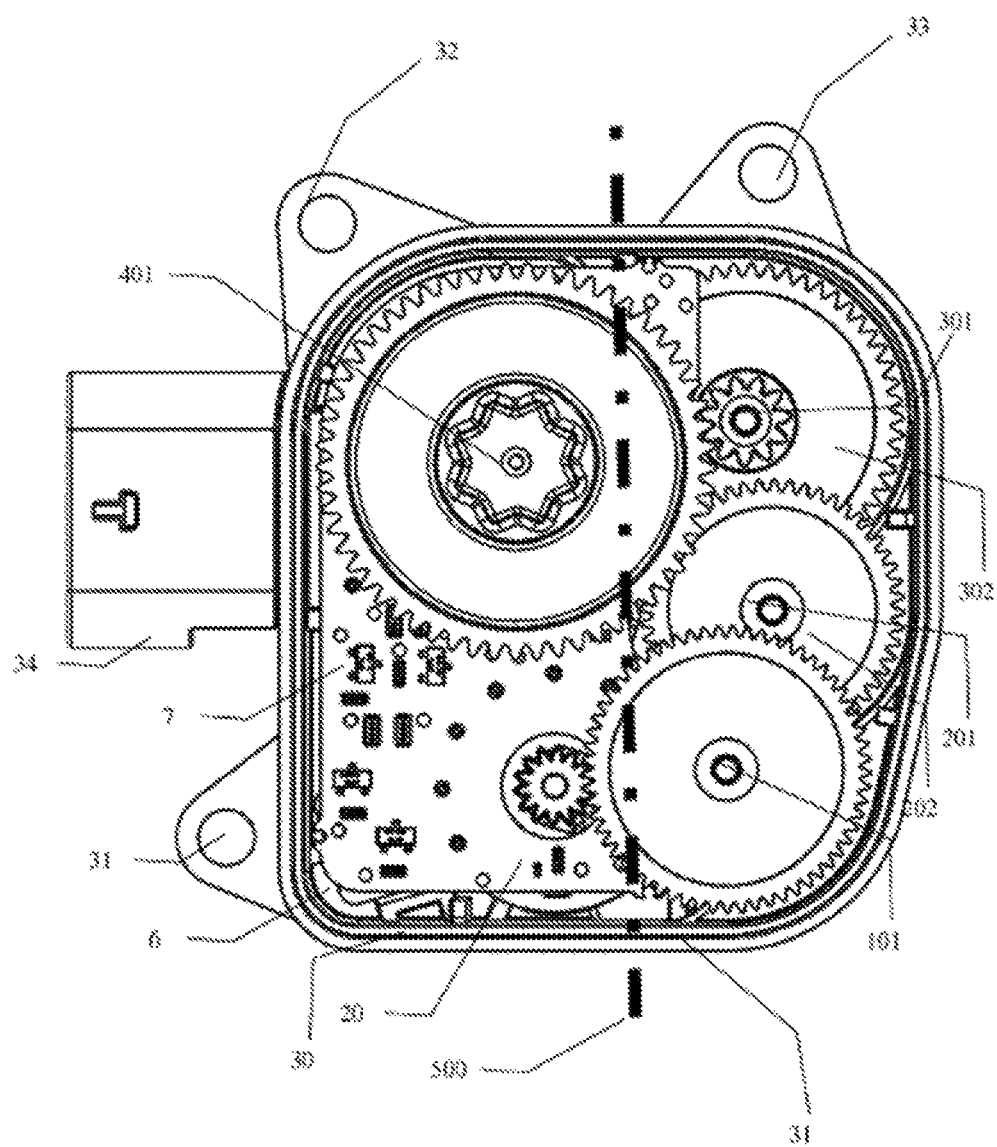
FIG. 4 shows a view of a gear motor and the housing thereof without cover according to the invention.
Figure 5:
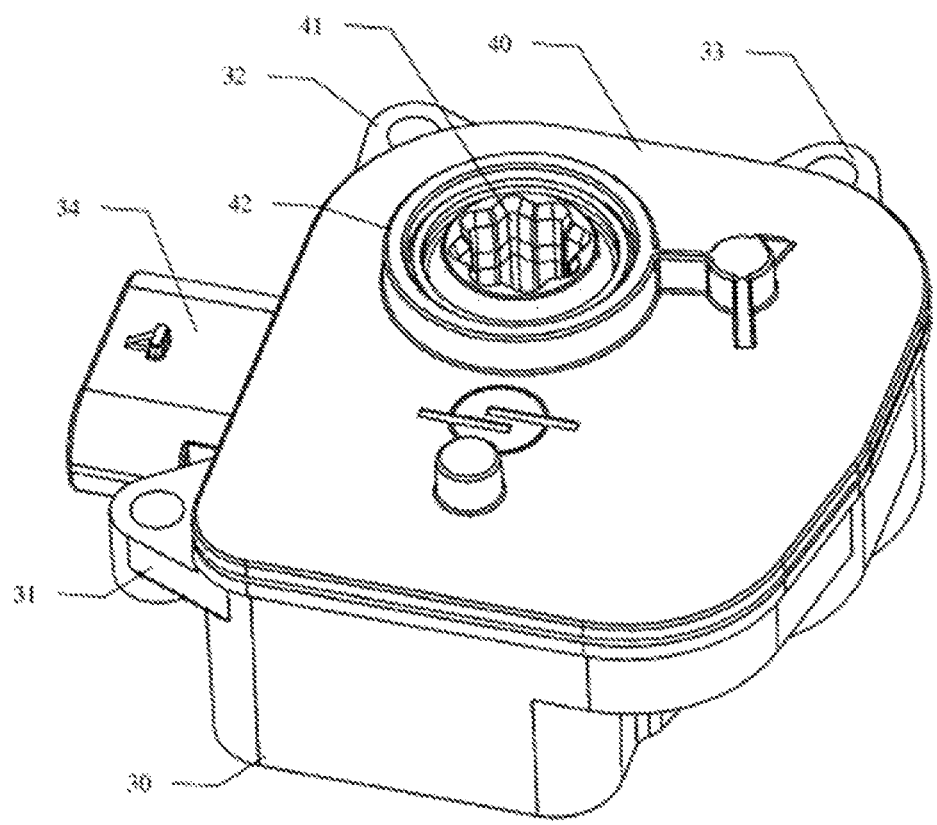
FIG. 5 shows a view in perspective of the housing of a gear motor according to the invention.
Figure 6:
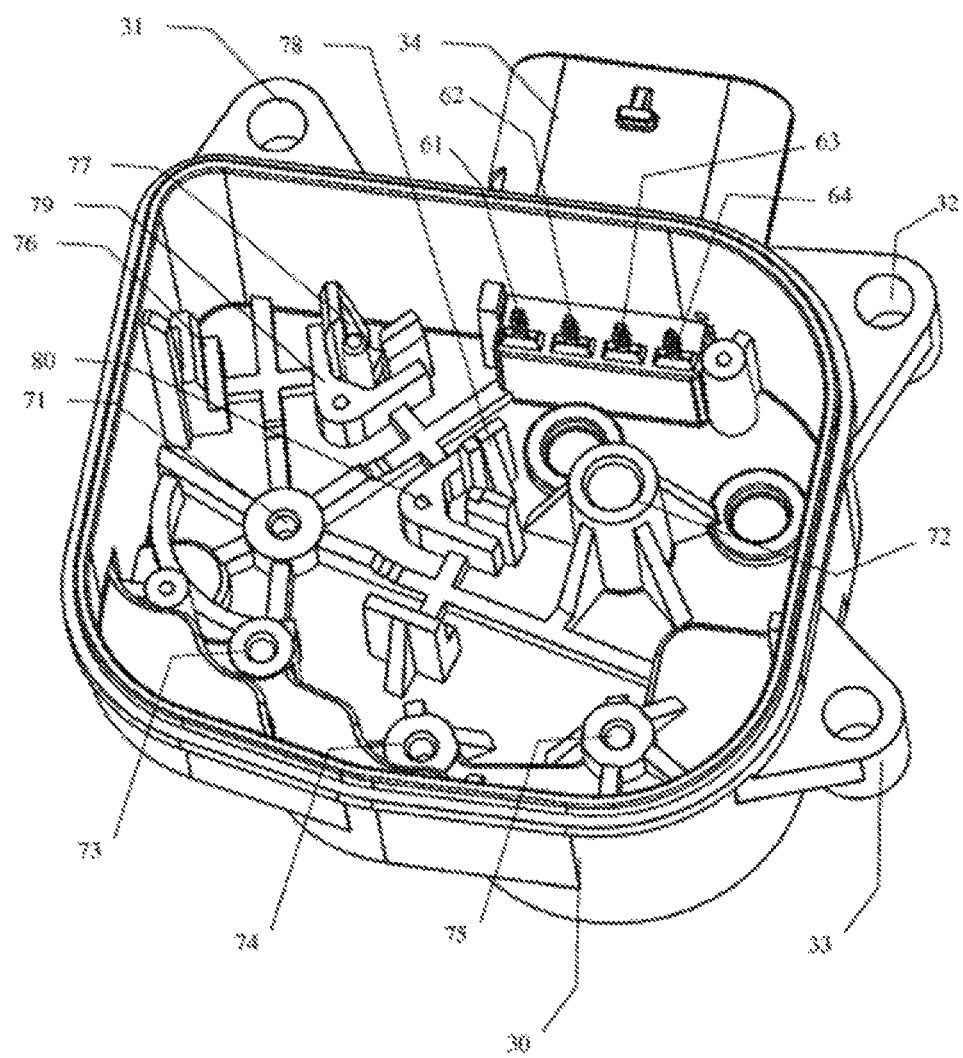
FIG. 6 shows a view in perspective of the interior of the housing of a gear motor according to the invention.

The housing (30) receives a cover (40) visible in FIG. 5, with a hole for the installation of an annular bearing (42) for the passage of the output shaft (401) having an inner ribbed ring (41), serving as a component for coupling to an element for closure of a valve, for example. As can be seen in FIG. 6, the bottom of the housing (30) has bearings (71, 72) for guiding the shafts (1, 401) respectively of the rotor (2) and the output wheel (402), as well as bearings (73 to 75) for guiding the shafts (101, 201, 301) of the intermediate stages (100, 200, 300). As illustrated in FIG. 4, the printed circuit (20) has a hole for the passage of the shaft (401) of the output wheel, as well as a lateral cutout for the passage of the wheel (202) of the second stage.

Grounding the Stator

In order to ground the stator assembly (3), the actuator includes a metal spring (52) in contact with one side of the stator assembly (3) between two poles (6, 7). The bottom of the housing (30) has a stepped or sloped surface, to form a reception zone of the lower end (54) of the spring that is not parallel to the transverse plane. This configuration results in a buckling of the spring when it is placed under stress, which forces a mechanical and thus electrical contact between the coils of the spring (52) and the outer surface of the stator assembly (3).

On the opposite side, the spring (52) comes in contact with a conductor track of the printed circuit (20), which is connected to ground. When the printed circuit (20) is put in place, it is pressed onto the spring (52), thus compressing it and ensuring a good electrical and mechanical connection between the yoke of the stator assembly (3) and a conductor track (not shown) connected to ground. The bottom of the housing (30) also has fins (76 to 78) for the alignment of the stator poles (4 to 6) as well as support zones (79, 80) on which the stator assembly (3) is supported.

Figure 7:
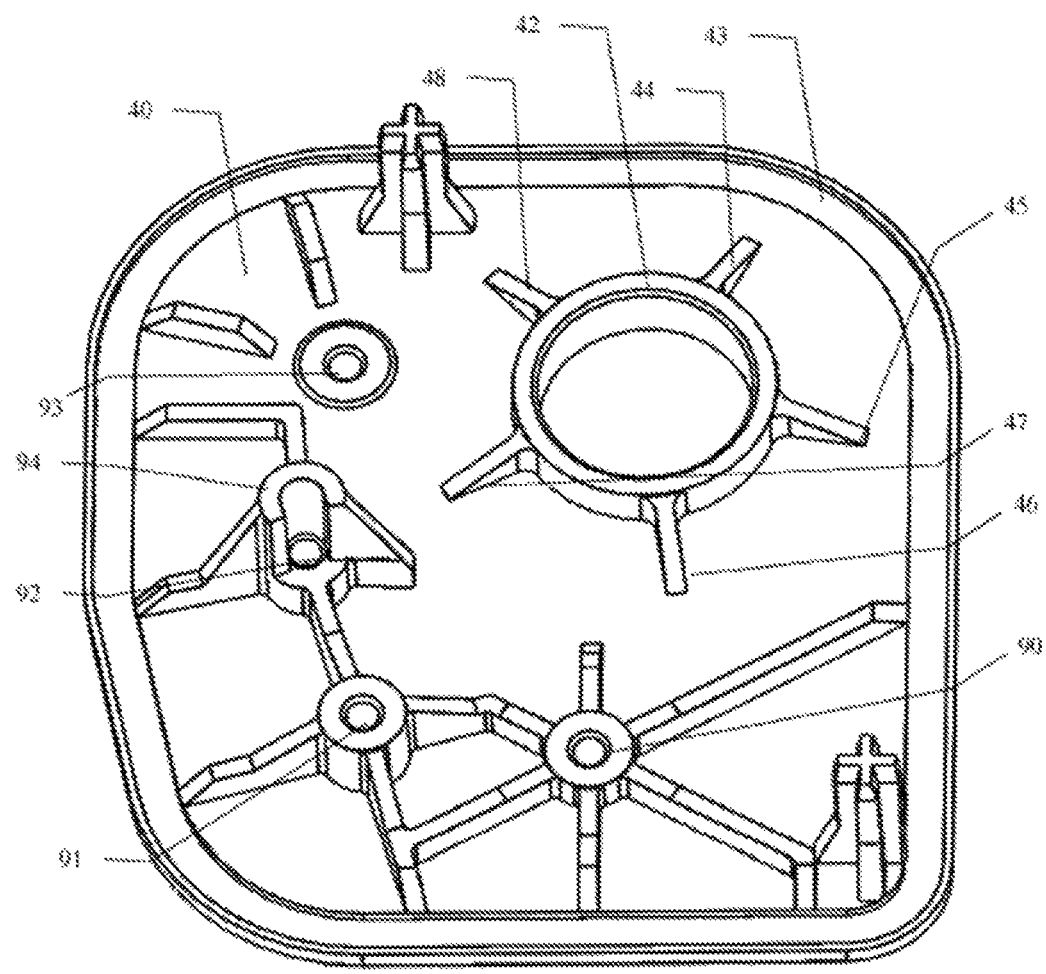
FIG. 7 shows a bottom view in perspective of the cover of the housing of a gear motor according to the invention.
Figure 8:
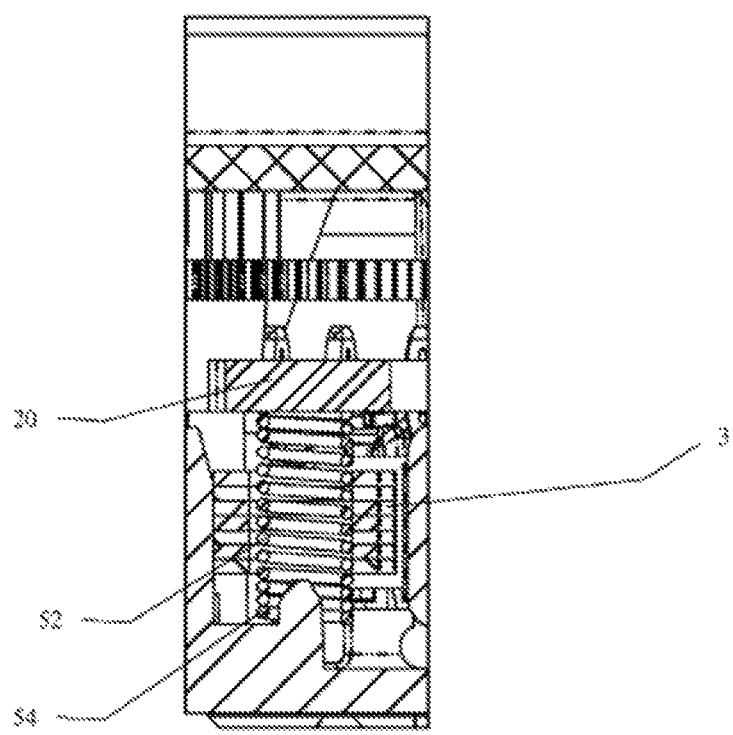
FIG. 8 shows a detailed view of the electrical connection between the stator assembly and the printed circuit.

In FIG. 7, the cover (40) has a peripheral edge (43) that is sealably pressed against the border (35) of the housing (30). The cover (40) has a plurality of projections including an annular bearing (42) for guiding the shaft (401) of the output wheel (402). Said annular bearing (42) is surrounded by ribs (44 to 48) serving as mechanical stiffeners, oriented radially in the directions of most of the forces being exerted on the output wheel (402).

The cover (40) also has a bearing (90) for guiding the shaft (2) of the rotor (1) as well as bearings (91 to 93) for guiding the shafts (101, 201, 301) of the intermediate stages (100, 200, 300). The bearing (92) has a semi-tubular extension (94) allowing the insertion of the shaft (201).

Figure 10:
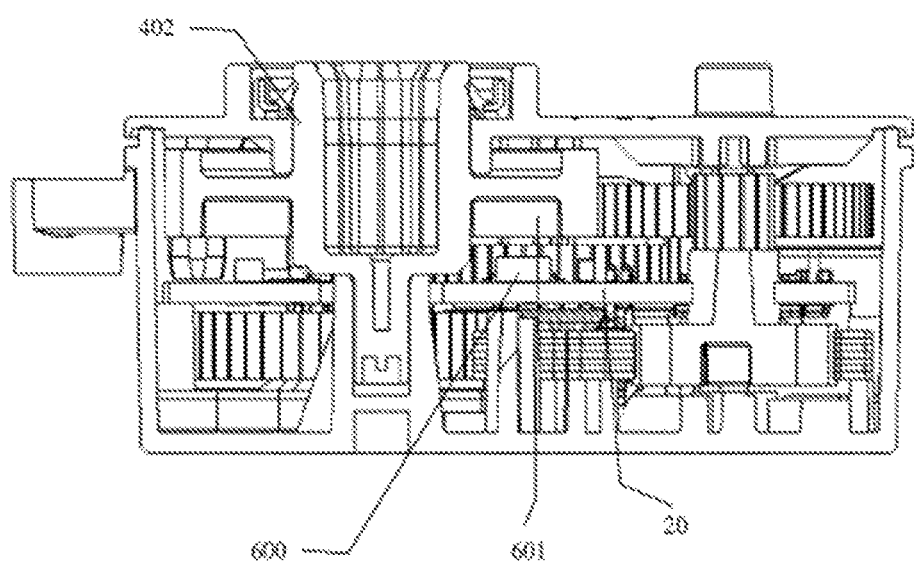
FIG. 10 shows a cross-sectional view of a gear motor according to the invention comprising a position sensor of the output wheel.

FIG. 10 shows a case in which the output wheel (402) incorporates, integrally, a permanent magnet (601) used for detecting the position of the output wheel (402). Facing the magnet (601), a magnetism-sensitive probe (600) is positioned on the printed circuit (20), detecting the variations of the magnetic field (intensity or direction) emitted by the magnet (601) based on the position of said magnet (601). Ideally but without limitation, the magnetization of the magnet (601) in the direction and/or amplitude thereof will be chosen in order to enable a linear variation of the signal delivered by the magnetism-sensitive probe (600) based on the rotation of the output wheel (402).

Figure 11:
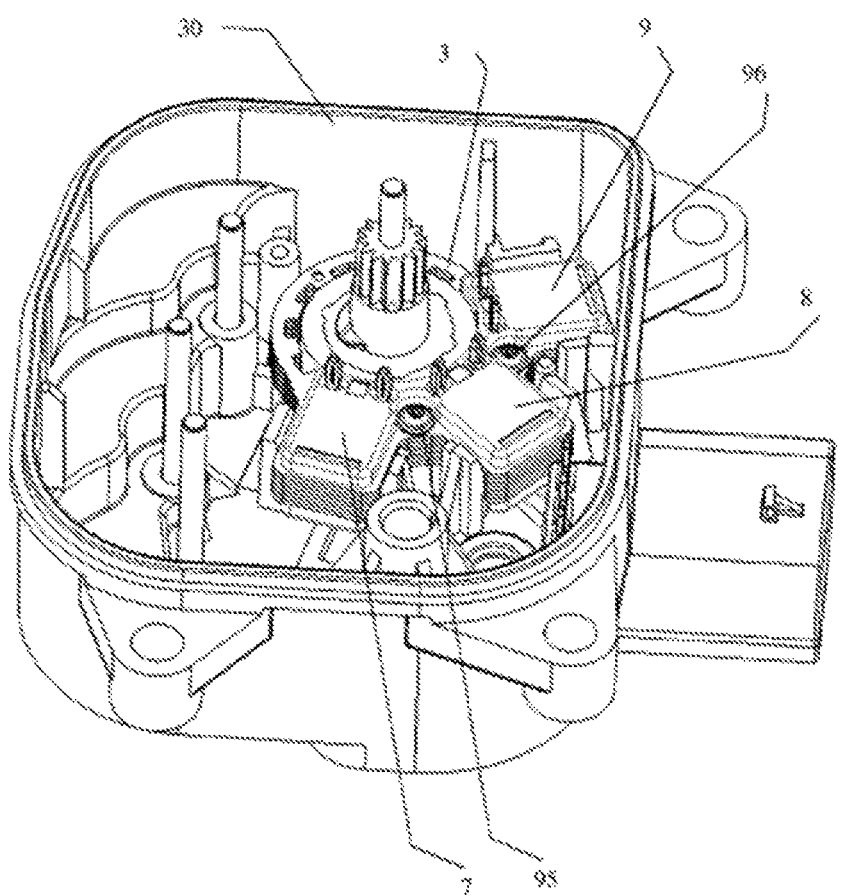
FIG. 11 shows a view in perspective of a housing without cover with a view of a screwed-down stator.

FIG. 11 shows an isolated view of the housing (30) with the stator assembly (3) onto which the electric windings (7 to 9) of a motor, three-phase here, are over-molded by an injectable type plastic material, for example. The overmolded stator assembly (3) is screwed to the housing (30) by means of screws (95, 96), thus enabling the stator assembly (3) to be secured to the housing (30) and to provide resistance to mechanical vibrations that may be exerted on the gear motor during the operation thereof.

Figure 12:
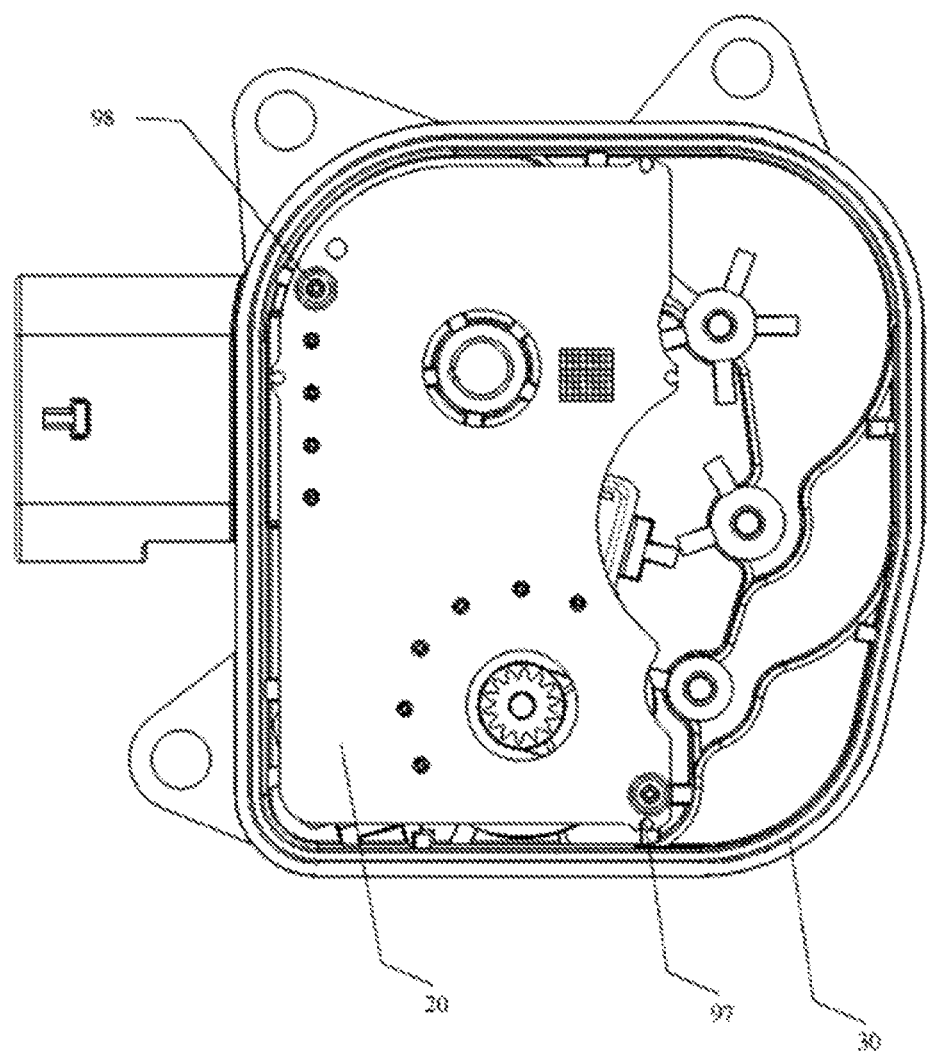
FIG. 12 shows a top view of a motor without cover with a view of the printed circuit.

FIG. 12 shows how the printed circuit (20) is secured to the housing (30) by means of attachment screws (97, 98), above the stator assembly (3) and before mounting the gears of the gear reducer. Here again, this attachment enables the gear motor to have resistance to mechanical vibrations that may be exerted on the gear motor during the operation thereof.

The invention claimed is:

1. A gear motor comprising a housing, an electric motor including a stator assembly and a rotor driving a reduction gear train having a plurality of intermediate stages each including a shaft coupled to a toothed wheel and a toothed gear, and an output stage including a shaft coupled to a wheel and a coupling component, said shafts of said rotor, of said intermediate stages and of said output wheel being parallel, a printed circuit transversely positioned above said stator assembly, said wheel of said output stage being positioned above a portion of said stator assembly, said shafts of said intermediate stages being located in the zone of the housing located on the opposite side, relative to a transverse vertical plane, of the zone comprising said shaft of said rotor and of said shaft of said output wheel, and at least one gear in said reduction gear train is on a plane of said printed circuit.

2. The gear motor according to claim 1, wherein said stator assembly has at least two stator extensions being poles each carrying one winding, a semi-annular closure zone, and said wheel of the output stage is positioned above a portion of at least one of said stator extensions and of said windings.

3. The gear motor according to claim 1, wherein:
said stator assembly includes three stator extensions which include poles offset two-by-two by 60°, a semi-annular closure zone extending over 240° and a rotor driving a reduction gear train having a plurality of intermediate stages, each of said shafts are coupled to a gear and a wheel, and said output stage includes said shaft coupled to said wheel and a coupling component;
said gear motor further comprising an electronic circuit equipped with at least one electromagnetic probe configured to detect magnetic flux generated by said rotor, transversely positioned above said stator;
said wheel of said output stage being positioned above one of said stator extensions,
where said shafts of said intermediate stages are located on an arc in the zone of the housing complementary to said zone comprising said rotor and said shaft of the output stage, where said zone is located on the opposite side, relative to a transverse vertical plane, of said zone comprising said shaft of said rotor and of said output wheel.

4. The gear motor according to claim 1, wherein a ratio between a length and a width of said housing, without a connector or an attachment member, is between 0.8 and 1.2.

5. The gear motor according to claim 1, wherein said printed circuit is equipped with at least one magnetism-sensitive probe configured to detect magnetic flux generated by said rotor.

6. The gear motor according to claim 1, wherein said printed circuit is positioned in a plane above said zone comprising said stator assembly and said wheel of said third intermediate stage, and beneath said zone comprising said wheel of said first intermediate stage and of said output wheel.

7. The gear motor according to claim 1, wherein said printed circuit has a cutout for passage of said wheel of said second intermediate stage.

8. The gear motor according to claim 1 wherein said printed circuit has an additional magnetism-sensitive probe positioned facing a displacement zone of a permanent magnet attached to a lower surface of said wheel of said output stage.

9. The gear motor according to claim 1, wherein said printed circuit extends transversely in a zone comprising said shaft of said rotor and of said output wheel.

10. The gear motor according to claim 1, wherein said cover has hollow projections comprising guide bearings of said shafts of said rotor, of said intermediate stages and of said shaft of said output stage.

11. The gear motor according to claim 10, wherein said projections are surrounded by ribs at least one of which is oriented along a direction of lateral forces applied to a respective shaft.

12. The gear motor according to claim 1, wherein a reduction ratio of each said stage is between 3 and 6.

13. The gear motor according to claim 1, comprising three intermediate stages and a total reduction ratio is between 200 and 600.

* * * * *